(12) United States Patent
Devalapura

(10) Patent No.: US 8,397,455 B2
(45) Date of Patent: Mar. 19, 2013

(54) HIGH STRENGTH COMPOSITE WALL PANEL SYSTEM

(75) Inventor: Ravi K. Devalapura, New Albany, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 119 days.

(21) Appl. No.: 12/175,816

(22) Filed: Jul. 18, 2008

(65) Prior Publication Data

US 2009/0013631 A1    Jan. 15, 2009

Related U.S. Application Data

(63) Continuation of application No. 10/915,215, filed on Aug. 10, 2004, now abandoned.

(51) Int. Cl.
*E04B 1/76* (2006.01)

(52) U.S. Cl. .............. 52/309.11; 52/309.12; 52/309.17; 52/405.1; 52/404.2

(58) Field of Classification Search ............... 52/309.11, 52/309.12, 309.17, 405.1, 404.2, 404.3
See application file for complete search history.

(56) References Cited

U.S. PATENT DOCUMENTS

| | | | |
|---|---|---|---|
| 1,934,134 A * | 11/1933 | McChesney | 411/478 |
| 4,019,296 A | 4/1977 | Jochmann | |
| 4,044,520 A | 8/1977 | Barrows | |
| 4,318,258 A | 3/1982 | Heck | |
| 4,586,958 A * | 5/1986 | Matsuura et al. | 106/15.05 |
| 4,677,800 A | 7/1987 | Roodvoets | |
| 4,703,604 A | 11/1987 | Muller | |
| 4,739,599 A | 4/1988 | Lopez et al. | |
| 4,841,702 A | 6/1989 | Huettemann | |
| 5,056,281 A | 10/1991 | McCarthy | |
| 5,067,298 A | 11/1991 | Petersen | |
| 5,369,926 A | 12/1994 | Borland | |
| 5,511,346 A | 4/1996 | Kenworthy | |
| 5,615,525 A | 4/1997 | Kenworthy | |
| 5,673,525 A | 10/1997 | Keith et al. | |
| 5,704,172 A | 1/1998 | Gougeon et al. | |

(Continued)

FOREIGN PATENT DOCUMENTS

| | | |
|---|---|---|
| DE | 3407184 | 9/1984 |
| EP | 0261919 | 3/1988 |

(Continued)

OTHER PUBLICATIONS

International Search Report dated Dec. 6, 2005 for PCT/US 2005/027299.

*Primary Examiner* — Joshua J Michener
*Assistant Examiner* — Matthew J Smith
(74) *Attorney, Agent, or Firm* — Calfee, Halter & Griswold LLP

(57) ABSTRACT

A composite wall panel is provided. The composite wall panel comprises a first layer of molded structural material and a second layer of molded structural material. An insulating foam layer is disposed between the first and second molded structural layers. The foam layer includes a first major side in contact with the first layer of molded structural material and a second major side in contact with the second layer of molded structural material. The first and second major sides of the insulating foam layer each have at least one groove. Each groove has at least one groove shoulder. At least one connector is configured to anchor the first and second layers of structural material to the insulating foam layer. The first and second layers of molded structural material extend into the grooves and under the groove shoulders to form a mechanical engagement between the insulating foam layer and the first and second layers of molded structural material.

25 Claims, 11 Drawing Sheets

U.S. PATENT DOCUMENTS

| | | |
|---|---|---|
| 5,809,723 A | 9/1998 | Keith et al. |
| 5,830,399 A | 11/1998 | Keith et al. |
| 5,976,670 A * | 11/1999 | Fugazzi ............ 52/309.17 |
| 5,987,834 A | 11/1999 | Keith et al. |
| 5,996,297 A | 12/1999 | Keith et al. |
| 6,112,491 A | 9/2000 | Keith et al. |
| 6,116,836 A | 9/2000 | Long, Sr. |
| 6,148,576 A | 11/2000 | Janopaul, Jr. |
| 6,156,328 A | 12/2000 | Alcott et al. |
| 6,263,638 B1 | 7/2001 | Long, Sr. |
| 6,305,135 B1 * | 10/2001 | Inaba ............ 52/309.12 |
| 6,895,720 B2 * | 5/2005 | Keith ............ 52/309.11 |
| 2004/0055236 A1 | 3/2004 | Keith |
| 2004/0055247 A1 | 3/2004 | Keith |
| 2004/0118067 A1 | 6/2004 | Keith |

FOREIGN PATENT DOCUMENTS

| | | |
|---|---|---|
| GB | 961536 | 6/1964 |
| GB | 2086447 | 5/1982 |
| WO | WO 94/23143 | 10/1994 |

* cited by examiner

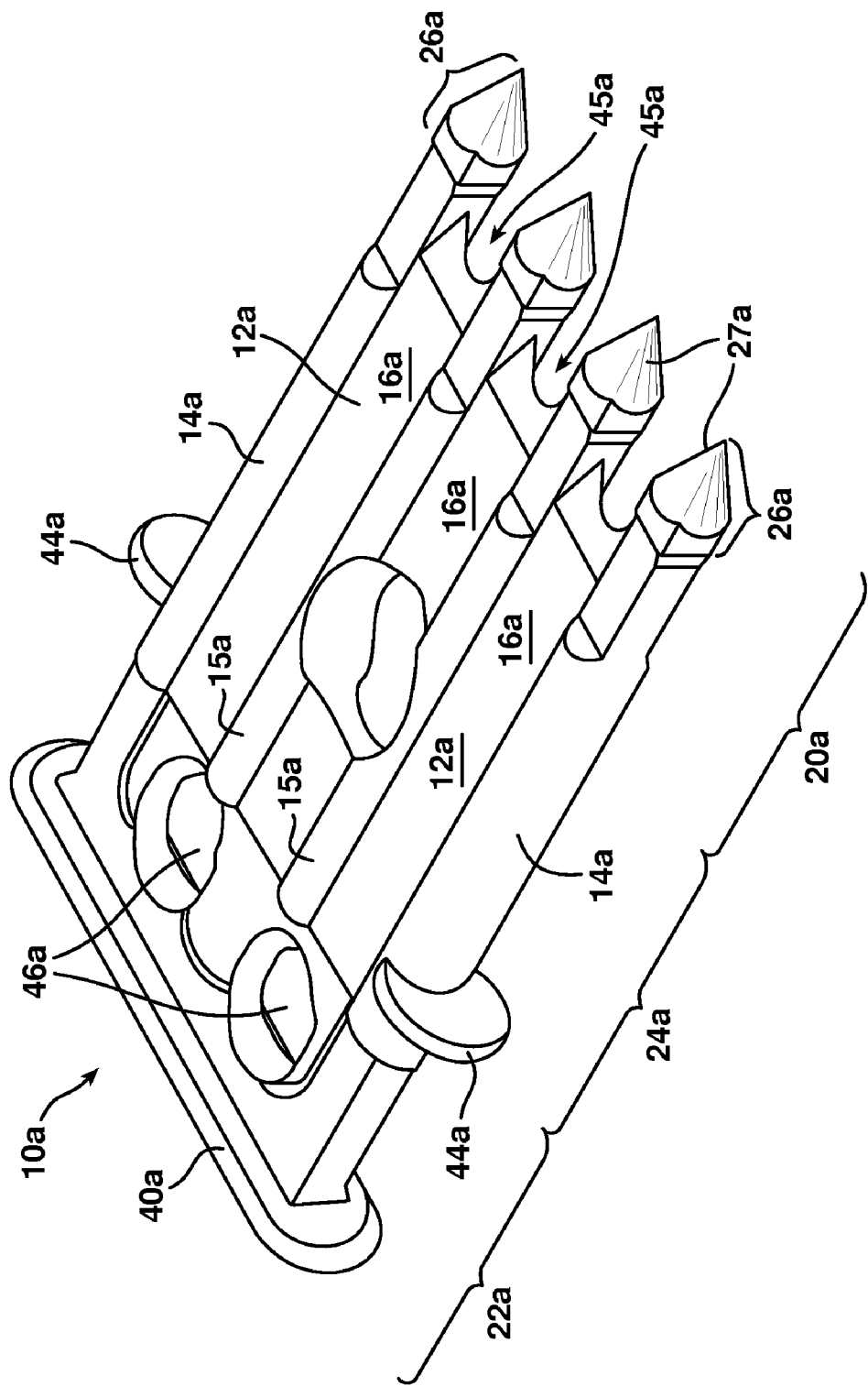

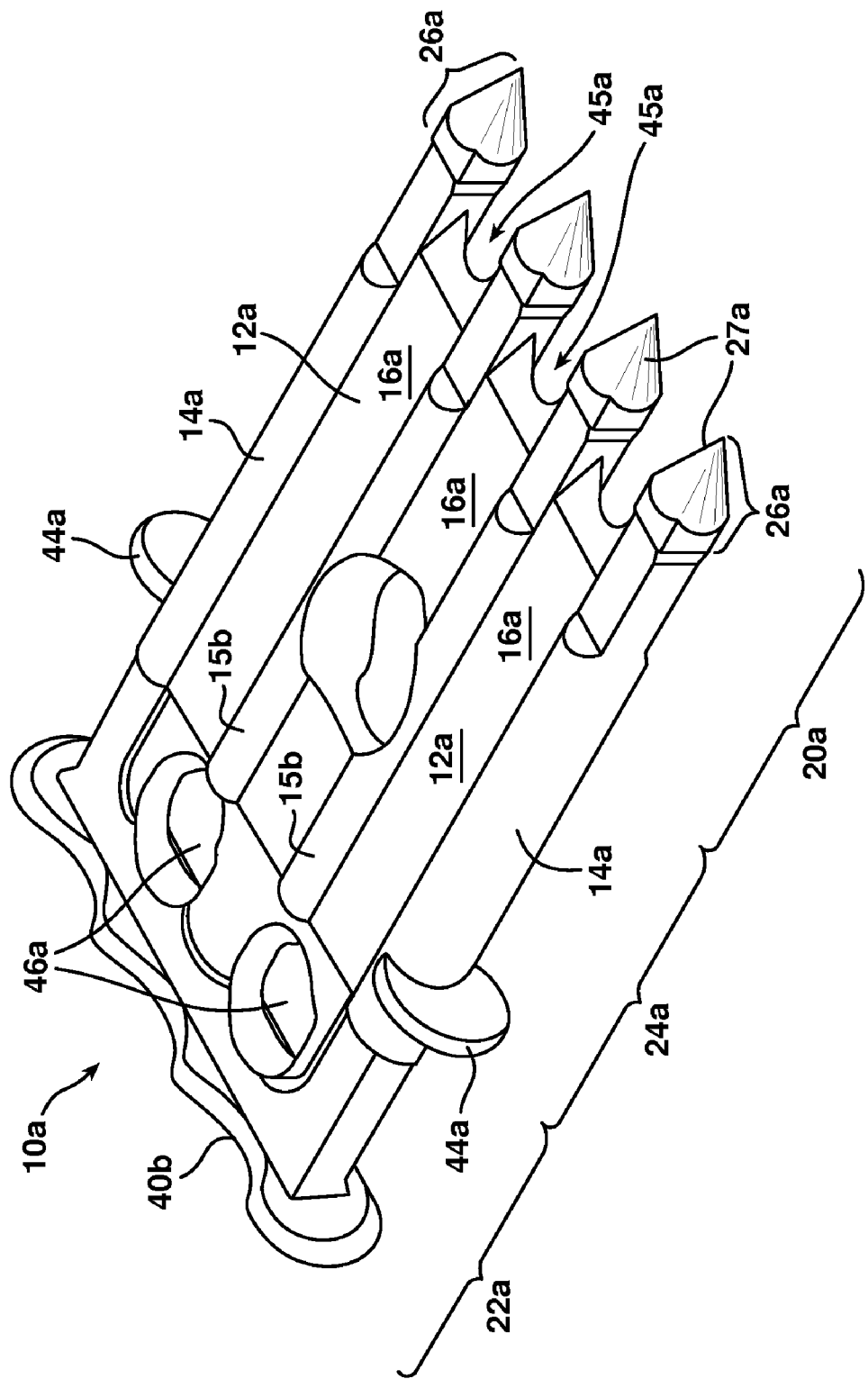

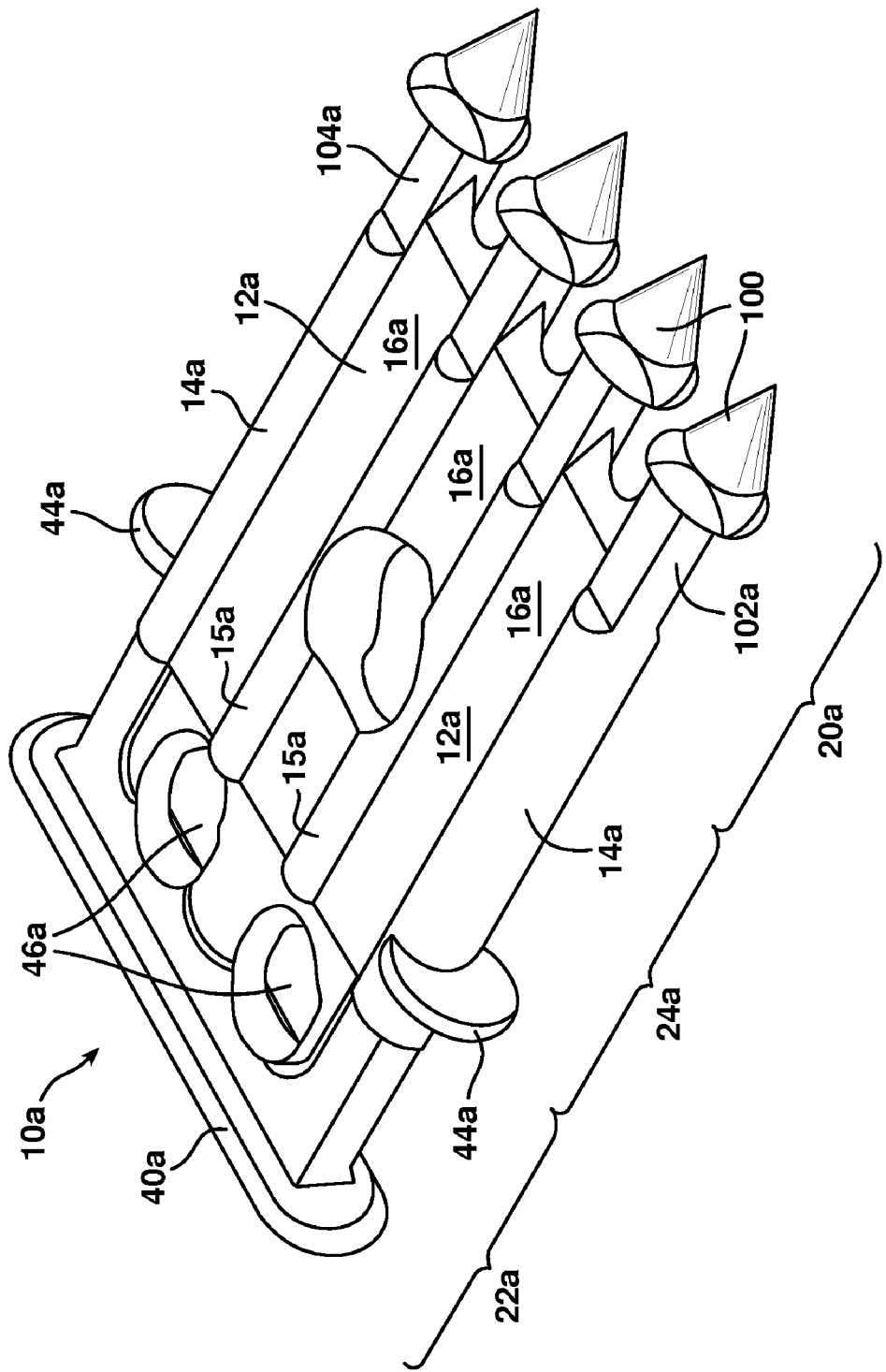

HIGH STRENGTH COMPOSITE WALL PANEL SYSTEM

RELATED APPLICATIONS

This application is a continuation of Ser. No. 10/915,215, filed Aug. 10, 2004, now abandoned.

TECHNICAL FIELD AND INDUSTRIAL APPLICABILITY OF THE INVENTION

The present invention relates to the field of concrete wall structures and, more specifically, to the field of high composite action wall structures.

BACKGROUND OF THE INVENTION

In the area of building and construction, concrete wall panels have been fabricated and then coated or layered with insulation having relatively low strength to provide a well-insulated wall structure having high strength. Typically, a structural wall is built and insulation is applied when finishing the wall. The insulation inhibits the flow of thermal energy through the wall.

A commonly used measurement of the thermal insulating qualities of a material is the mathematical coefficient "R", which is a measure of the thermal resistance of a material. The coefficient R is equal to the thickness divided by the thermal coefficient "K". A high R value provides a high degree of high thermal resistance or insulating ability.

Concrete, formed of hydraulic cement binder, water and aggregate is a relatively high strength, low cost building material. Unfortunately, concrete has the drawback of offering a poor K value and thus provides little thermal insulation. An 8 inch slab of concrete has an R value of approximately 0.64; a 1 inch panel of polystyrene foam has an R value of approximately 5; and a 3.5 inch layer of glass fiber building insulation provides an R value of approximately 13. Polystyrene and fiberglass provide a high R value but offer little or no structural strength.

Often walls are built with a structural layer that has a decorative wythe fixed to the outer or inner surface. The wythes typically include an intermediate space that can be fitted or retrofitted with any number of insulating materials, including fiberglass or polystyrene foams. The R-value of two insulated wythe walls is limited due to the structural bridging between the outer and inner wall. The structural bridging provides high strength and integrity and prevents the walls from collapsing. Structural bridges are typically metal studs, bolts, or beams. The structural bridges also serve as thermal bridges because the metal allows a thermal short bypassing the insulation. These thermal bridges cause the R-value of the constructed wall to be substantially lower than the R-value of the insulation wythe. U.S. Pat. No. 4,393,635 to Long, U.S. Pat. No. 4,329,821 to Long et al., U.S. Pat. No. 2,775,018 to McLaughlin, U.S. Pat. No. 2,645,929 to Jones, and U.S. Pat. No. 2,412,744 to Nelson disclose wall structures held together using metal tie rods or studs.

U.S. Pat. No. 4,829,733 to Long provides a plastic tie for forming an insulated wall having inner and outer concrete structural wythes with highly insulating wythes therebetween. The plastic tie is used in the construction industry, but is relatively expensive and difficult to manufacture and does not provide adequate composite action.

Composite action describes how well a multi-layered panel, or composite wall, transfers shear forces between its different wythes and is typically identified as a percentage between 0% and 100%. High composite action results in the transfer shear forces between the structural wythes so that the composite wall will have a moment of inertia approaching that of a solid wall having the overall thickness of a three wythe wall. Low composite action does not transfer shear forces and the wall will have a moment of inertia approaching that of the sum of moments of inertia of the individual wythes. Composite action provides structural integrity to the wall. Composite action is highly desirable because it strengthens the wall against the forces of the wind and reduces deflection of the wall. A high composite action wall can also be designed to meet code requirements while reducing the mass and cost of the wall. Accordingly, it is generally desirable to produce composite walls having high composite action so that they will remain intact when loads are applied to a wall. Existing connectors, however, have thus far proven inadequate for providing composite walls with the desired composite action. Although Composite Technologies Corporation, the assignee of the Long '733 patent, has made the claim that some of its connectors are able to provide 40% to 60% composite action, independent testing has shown that such connectors only provide about 10% composite action.

Insulated walls generally include an insulation wythe sandwiched between a structural wythe and a fascia wythe. The structural wythe is typically used as the load-bearing member of the wall. The fascia wythe is typically not used to bear a load separated from the structural wythe because of insufficient composite action existing between the facia wythe and the structural wythe. However, if the composite action of the wall was sufficiently high, e.g., between 60% to 100%, the fascia wythe could potentially be used to bear a substantial portion of the overall load.

Accordingly, there is currently a need in the art for insulating composite walls with high composite action.

SUMMARY OF THE INVENTION

According to this invention there is provided a composite wall panel. The composite wall panel comprises a first layer of molded structural material and a second layer of molded structural material. An insulating foam layer is disposed between the first and second molded structural layers. The foam layer includes a first major side in contact with the first layer of molded structural material and a second major side in contact with the second layer of molded structural material. The first and second major sides of the insulating foam layer each have at least one groove. Each groove has at least one groove shoulder. At least one connector is configured to anchor the first and second layers of structural material to the insulating foam layer. The first and second layers of molded structural material extend into the grooves and under the groove shoulders to form a mechanical engagement between the insulating foam layer and the first and second layers of molded structural material.

According to this invention there is also provided a composite wall panel. The composite wall panel comprises a first layer of molded structural material and a second layer of molded structural material. An insulating foam layer is disposed between the first and second molded structural layers. The foam layer includes a first major side in contact with the first layer of molded structural material and a second major side in contact with the second layer of molded structural material. The first and second major sides of the insulating foam layer each have at least one groove. The at least one groove has a dovetail cross-sectional shape. At least one connector is configured to anchor the first and second layers of structural material to the insulating foam layer. The first and second layers of molded structural material extend into the dovetail shape of the grooves to form a mechanical engagement between the insulating foam layer and the first and second layers of molded structural material.

According to this invention there is also provided a method of manufacturing a composite wall panel. The method comprises the steps of providing a first layer of unhardened structural material, placing an insulating foam layer in contact with the first layer of unhardened structural material such that a first major side of the insulating foam layer is in contact with the first layer of unhardened structural material, the insulating foam layer having a second major side, wherein the first and second major sides of the insulating foam layer each have at least one groove, the grooves having at least one groove shoulder, inserting at least one connector through the second major side of the insulating foam layer such that a penetrating segment of the connector resides within the first layer of unhardened structural material and a trailing segment extends from the second major side of the insulating foam layer, placing a second layer of unhardened structural material in contact with the second major side of the insulating foam layer such that the trailing segment of the connector extending from the second major side resides in the second layer of unhardened structural material, wherein the first and second layers of unhardened structural material flows into the grooves and under the groove shoulders to form a mechanical engagement between the insulating foam layer and the first and second layers of unhardened structural material and allowing the first and second layers of unhardened structural material to harden.

These and other benefits, advantages and features of the present invention will become more fully apparent from the following description and appended claims, or may be learned by the practice of the invention as set forth hereinafter.

BRIEF DESCRIPTION OF THE DRAWINGS

FIG. 1 is a perspective view of the connector of the invention;

FIG. 2 is a perspective view of another alternative embodiment of the connector of the invention;

FIG. 7 is a perspective view of an alternative embodiment of the connector of the invention.

DETAILED DESCRIPTION AND PREFERRED EMBODIMENTS OF THE INVENTION

Figure 3A:
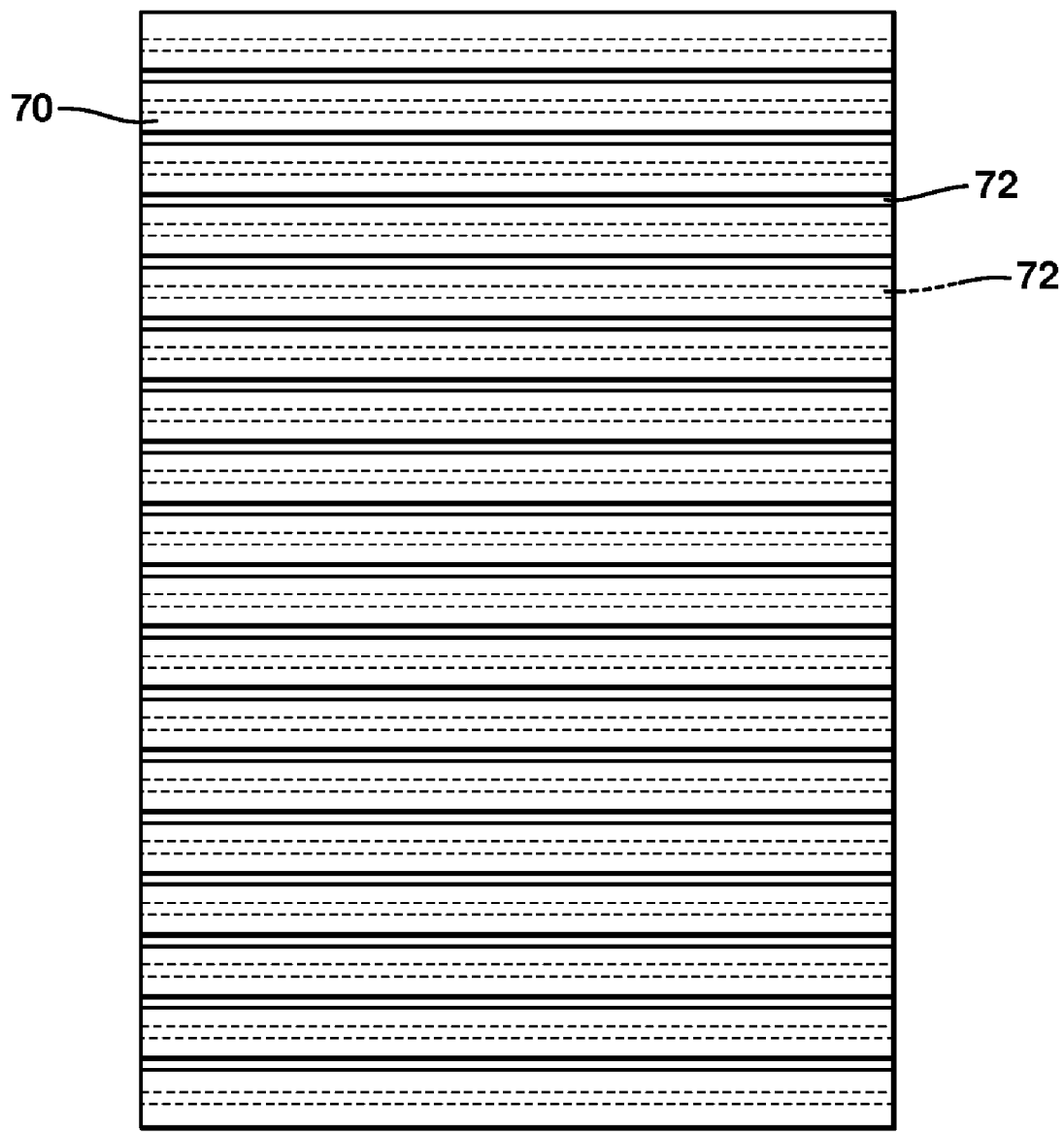
FIG. 3A is a plan view of an insulating wythe having a groove pattern that may be used in the composite wall structure of the present invention.

A detailed description of the connectors of the invention will now be provided with specific reference to figures illustrating various embodiments of the invention. It will be appreciated that like structures will be provided with like reference designations.

The embodiments of the present invention are generally directed to improved connectors used for the manufacture of insulating composite walls that include an insulation wythe sandwiched between two wythes of hardenable structural material. The connectors are specifically configured to secure the two wythes of structural material against the insulation wythe and to provide the resultant composite wall with from about 50% to 100% composite action.

The term "composite action," which is well known term in the art, generally refers to the ability of a composite wall to act like a single laminated wall rather than like a wall having a plurality of disconnected wythes. The following equation is used by the concrete industry (PreCast/Prestressed Concrete Institute PCI)) to define composite action as a percentage, within a range of 0% to 100%: $k=(I_{exp}-I_{nc})(I_c-I_{nc})$ wherein $I_{exp}$ is the experimentally determined moment of inertia of the test wall and $I_{nc}$ and $I_c$ are the respective theoretical values of the moments of inertia of the 0% composite action wall and of the 1000% composite action wall.

Hardenable structural materials may be any material that is configured to change from an unhardened or moldable state, in which the material is generally characterized as uncured, deformable, or fluid, to a hardened or molded state, in which the material is generally characterized as cured or solid. One example of a hardenable structural material includes concrete material including a hydraulic cement binder, water, an aggregate material and other appropriate admixtures. Other examples of the hardenable structural material include plasters, mortars, plastics, and resins. Hardenable structural materials when in a solid state may be used interchangeably with the term "structural material."

The insulation material is typically extruded polystyrene, different versions, sizes and thicknesses of which are distributed by Owens Corning of Toledo, Ohio under the FOAMULAR trademark. However, the use of other foams is possible, such as expanded polystyrene foam, polyurethane foam, polypropylene foam, polyisocyanate foam, polyisocyanurate foam, and combinations thereof.

Insulating composite walls are typically walls or other layered structures that include one or more insulation wythes disposed between wythes of structural material. Insulating composite walls are generally formed of three wythes; each of these wythes may also include a plurality of layers.

The connectors of the invention are preferably injection molded from any appropriate resin or other high strength plastic material, although they may also be molded by resin transfer molding, reaction injection molding, or any other single step or relatively simple molding process known in the art. It is also within the scope of the invention to utilize multi-step manufacturing processes, such as those that employ assembly and/or machining steps.

A preferred resinous material is polyphthalamide (PPA) resin because of the ease in which it may be injection molded. Other similar resinous materials include a polycarbonate resin and a polycarbonate-polybutylene terephthalate alloy, which are generally less expensive than polycarbonate resins.

Other resins that may be used to manufacture the connectors of the invention include, but are not limited to, epoxy resins and thermoset plastics. Other high strength, high R-value materials may also be used. The high R value generally minimizes the transfer of heat between the two wythes of the structural material in the composite wall that occurs through the connectors.

Although not necessary in many instances, it may be desirable to incorporate within the resinous material or other plastic material fibers such as glass fibers, carbon fibers, boron fibers, ceramic fibers, and the like in order to increase the tensile strength, bending strength, shear strength and toughness of the connectors.

FIGS. 1 and 2 illustrate the connector of the present invention, sidewalls 14a and raised longitudinal ribs 15a generally terminate within the first segment 20a into corresponding pointed tips 27a. This configuration of pointed tips 27a is particularly suitable for facilitating the insertion of the connector 10a through the insulation wythe of a composite wall. The connectors 10a of the invention may include a trailing wall 40a that extends at least partially between the sidewalls 14a within the trailing segment 22a. It will be appreciated that the trailing wall 40a may be formed in any desired shape according to the invention. FIG. 1 shows a trailing wall 40a that is generally rectilinear with rounded edges and corners, while FIG. 2 shows a trailing wall 40b that includes recessed portions along its length to facilitate gripping by a user. One use of the trailing wall 40a, 40b is for gripping the connector 10a. The trailing wall 40a, 40b can also be used for receiving a driving force sufficient for driving the connector 10a through the insulating wythe of a composite wall. Yet another function of the trailing wall 40a, 40b is to provide an anchor for securing the second segment within a wythe of structural material. For instance, the protrusion of the trailing wall 40a, 40b may be used as an anchor for securing the connector 10a within a wythe of structural material during the manufacture of a composite wall, as described below.

FIG. 7 illustrates an alternative embodiment of the present invention. The pointed tips 100 are larger than the leg portions 102a, 104a. This facilitates better insertion of the connector 10a through the insulation wythe of a composite wall.

The connectors illustrated in FIGS. 1 and 2 include a structure for orienting the connectors within the insulating wythe of a composite wall and at a predetermined depth. The connector may be oriented by a flange 44a affixed to and protruding away from the sidewalls 14a at the intersection of the trailing segment 22a and the mesial segment 24a. The flange 44a is specifically configured to engage the insulating wythe of a composite wall to prevent the trailing segment 22a from passing through the insulating wythe.

The connector embodiments illustrated in FIGS. 1 and 2 also may include one or more recesses 45a formed between pointed tips 27a. Recesses 45a allow reinforcement (e.g. rebar) that may be present in the first structural wythe to be inserted into the recesses 45a between the pointed tips 27a. In addition recesses 45a may increase the composite action of the connector.

Figure 5A:
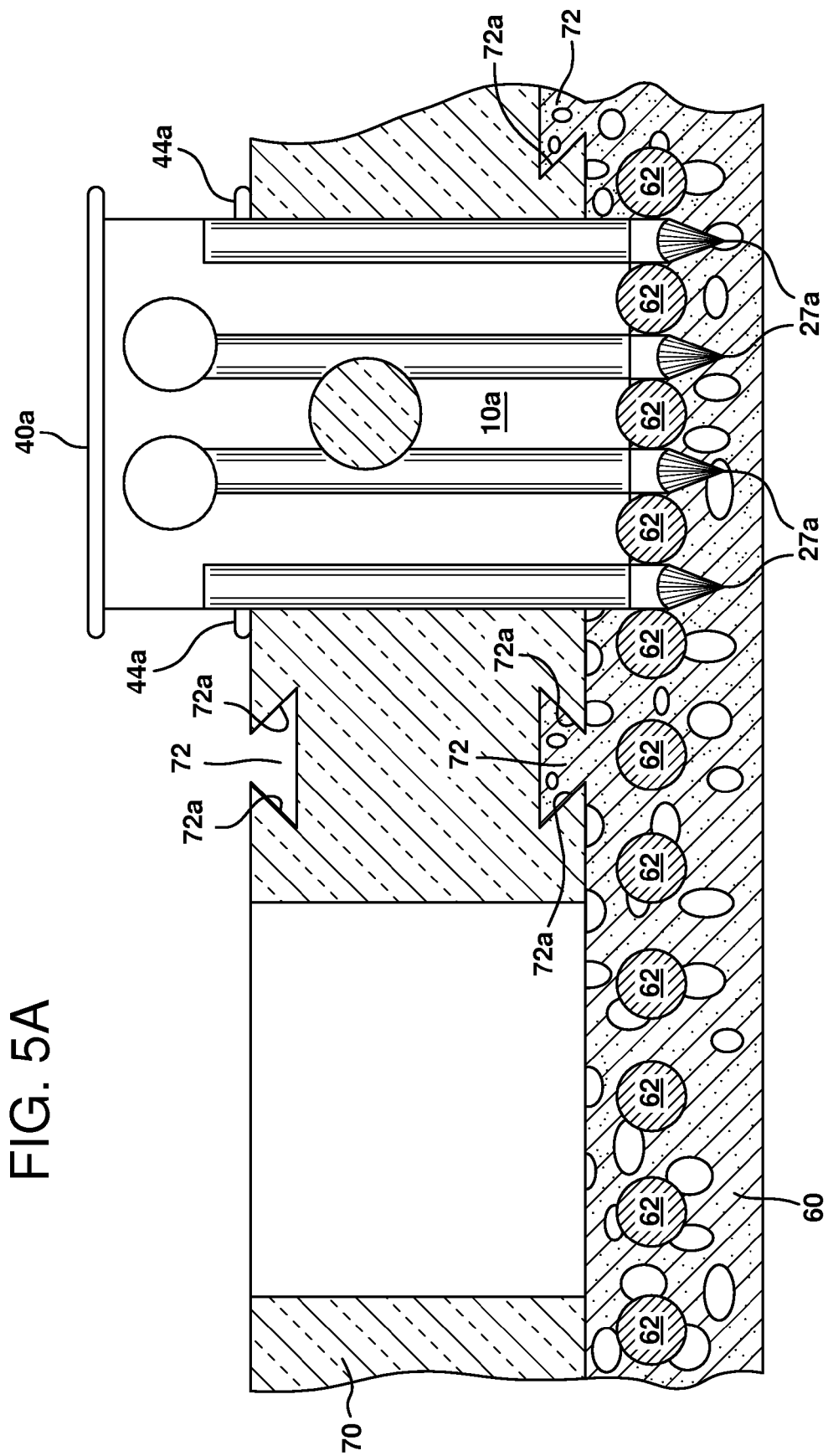
FIG. 5A is a cross-sectional view of a partially completed composite wall structure incorporating the connector illustrated in FIGS. 1 and 2.
Figure 5B:
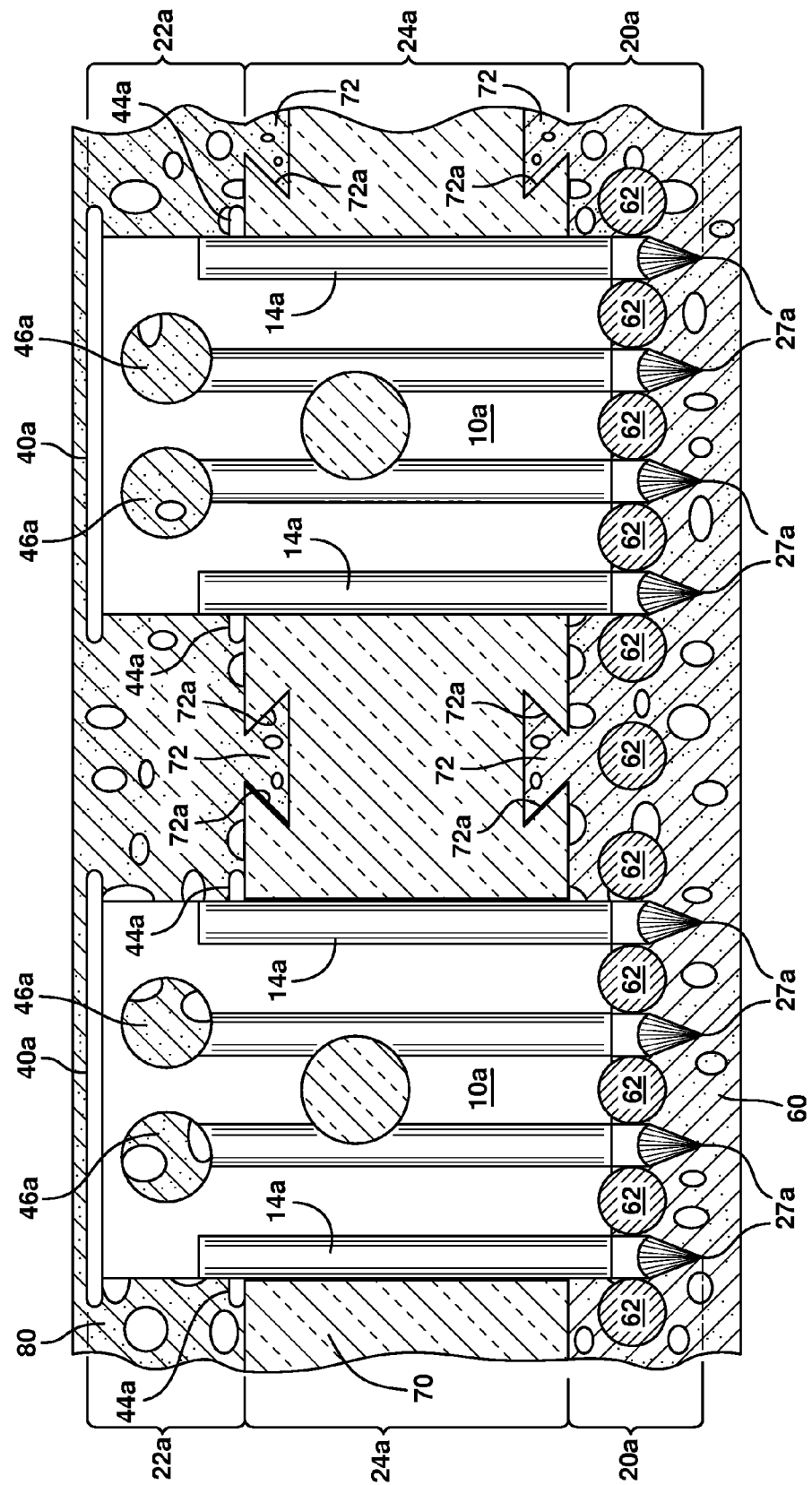
FIG. 5B is a cross-sectional view of a completed composite wall structure incorporating the connector illustrated in FIGS. 1 and 2.

FIGS. 5A and 5B show how the connectors 10a can be used to manufacture a composite wall. The use of connectors 10a will be described in detail hereinafter. In a preferred method for manufacturing composite wall structures, a first wythe 60 of a structural material is poured into an appropriate form (not shown). In general, the first structural wythe will be a rectangular slab, although it may also include other design, ornamental or structural features. The only limitation is that it have a thickness or depth great enough to give the first structural wythe 60 adequate strength and the ability to firmly anchor the first segment 20a of the connector 10a therein.

Before the first structural wythe 60 obtains such rigidity that a connector 10a cannot be inserted therein without damaging the ultimate structural integrity and strength of the first structural wythe 60, an insulating wythe 70 is placed adjacent to the exposed side of the first structural wythe 60. The insulating wythe 70 may, although not necessarily, include a plurality of holes or slots through which the connectors of the invention may be inserted.

The connector 10a is then pushed or driven through the insulation wythe 70 and into the first structural wythe 60 while the structural material is still unhardened. The tapered end 26a on the connector 10a is configured to facilitate passage of the connector 10a through any preformed holes or to cut through the insulation when there are not any preformed holes in the insulation wythe, thereby facilitating the insertion of the connector 10a in either event. In order to insert the connector 10a to a desired depth, it may be necessary to apply a driving force to the trailing wall 40a of the connector 10a. This driving force may be applied by hand or with a tool, such as a hammer or mallet. The connector 10a is inserted to the insulation wythe 70 until the flange 44a protruding away from the web portion 16a engages against the insulation wythe 70, thereby indicating the desired depth has been reached. Accordingly, the flange 44a may be formed of any suitable structure for orienting the connector 10a within the insulation wythe 70 at a predetermined depth.

Once the connector 10a is properly oriented within the insulation wythe 70, the structural material of the first structural wythe 60 flows into and engages hole formations 46a or other anchor of the first segment 20a of the connector 10a. The structural material also flows into groove 72 formed in insulation wythe 70. Vibration of the structural wythe 60 and/or movement of the insulation wythe 70 or connector 10a may be necessary to ensure adequate engagement of the groove 72 and first segment 20a with the structural material. Once the structural material cures, the connector 10a is effectively anchored within the first structural wythe 60 and the insulation wythe 70 is anchored to the structural wythe 60 by groove 72.

Figure 4A:
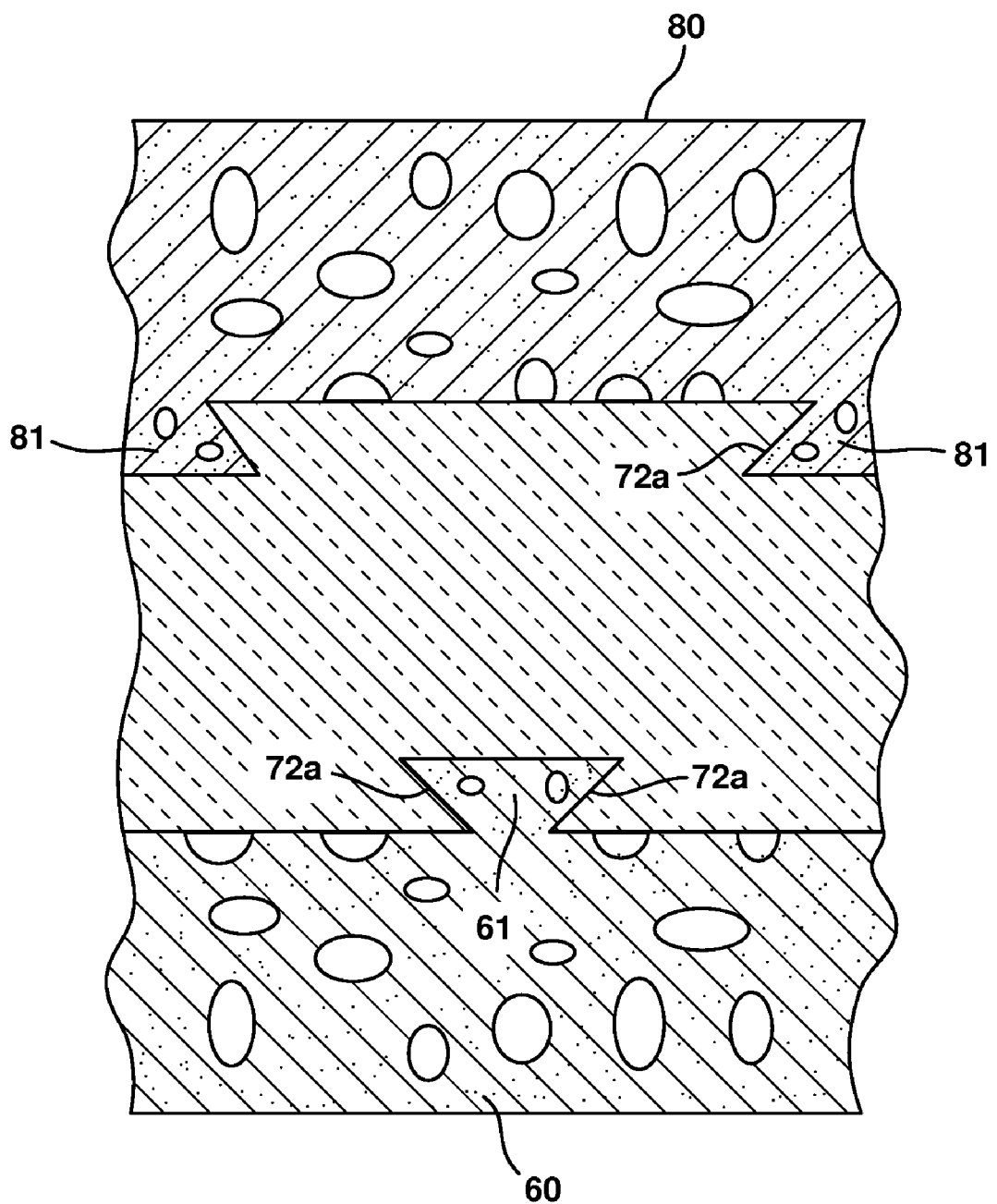
FIG. 4A is a cross-sectional view of an insulating wythe showing a groove structure that may be used as the insulating wythe of the present invention.
Figure 4B:
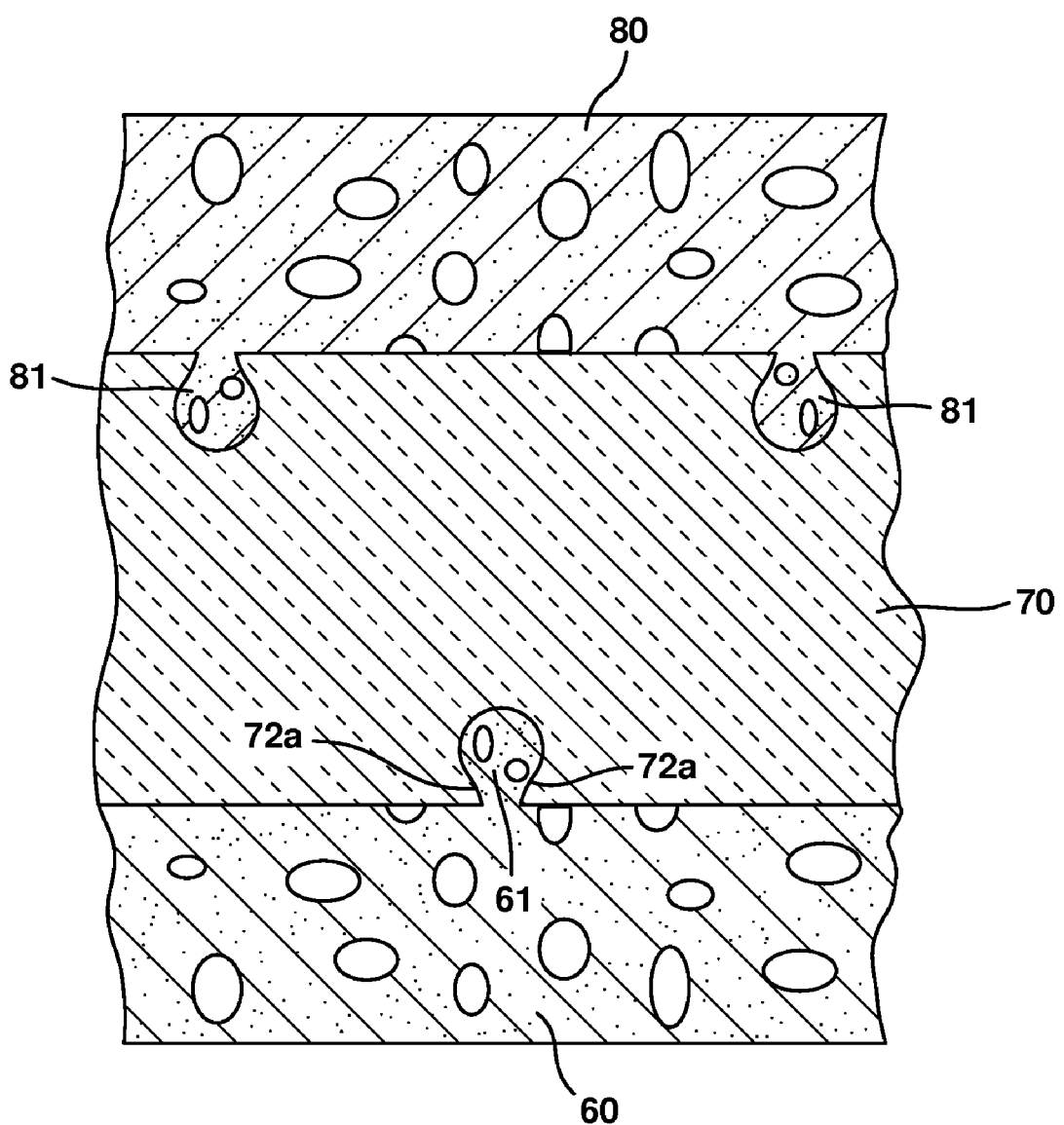
FIG. 4B is a cross-sectional view of an insulating wythe showing another groove structure that may be used as an insulating wythe of the present invention.

After the first structural wythe 60 has achieved an adequate level of hardness or strength, a second wythe of structural material is poured over the surface of the insulating wythe 70 to form the second structural wythe 80, as shown in FIG. 4B. The depth of the second structural wythe 80 should be such that it completely, or at least substantially, engulfs the trailing wall 40a of the connector and engages any anchor formed in the trailing segment 22a of the connector 10a, thereby providing an adequate anchoring effect of the connector 10a within the second structural wythe 80. The material of structural wythe 80 flows into groove 72 to anchor structural wythe 80 to insulation wythe 70. The flange 44a also aids in preventing the hardened second structural wythe 80 from collapsing against the first structural wythe 60 when hardened and tilted up or otherwise positioned for use.

Figure 3B:
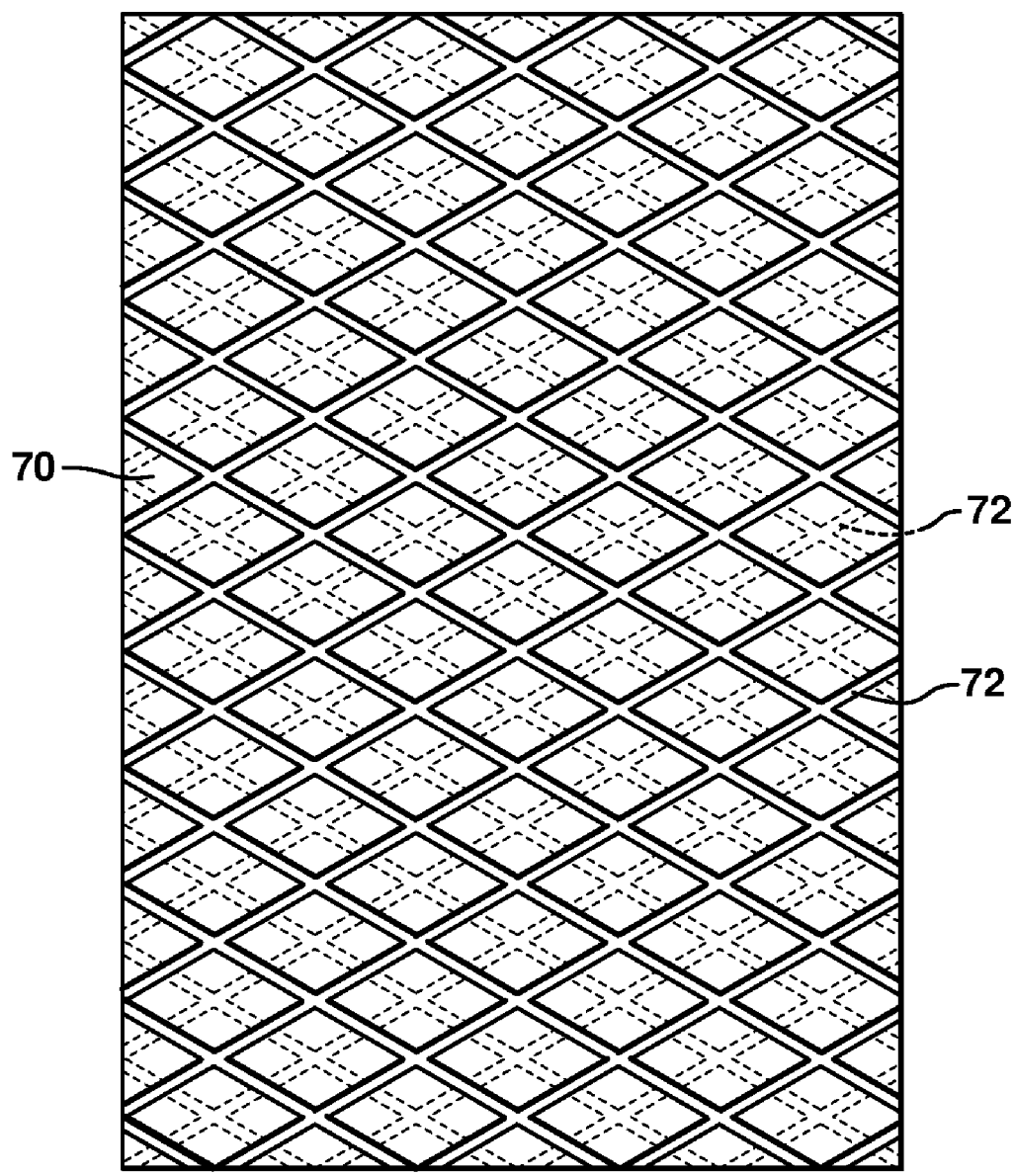
FIG. 3B is a plan view of an insulating wythe having a groove pattern that may be used in the composite wall structure of the present invention.

FIG. 4B shows the use of keyhole or truncated tear drop shaped grooves 72 formed on the major surfaces of the insulating wythe 70. The material of the structural wythes 60, 80 flows into grooves 72 and forms a mechanical bond between the structural material 60 and the insulation wythe 70. Grooves on opposite major surfaces of the insulation wythe 70 may be formed congruently, as shown in FIG. 3B or may be offset or staggered.

FIGS. 5A and 5B illustrate a preferred method for manufacturing composite wall structures using the connectors 10a of FIG. 1. A first wythe 60 of a structural material is poured into an appropriate form (not shown). In general, the first structural wythe will be a rectangular slab, although it may also include other design, ornamental or structural features. The only limitation is that it have a thickness or depth great enough to give the first structural wythe 60 adequate strength and the ability to firmly anchor the first segment 20a of the connector 10a therein.

Before the first structural wythe 60 obtains such rigidity that a connector 10a cannot be inserted therein without damaging the ultimate structural integrity and strength of the first structural wythe 60, an insulating wythe 70 is placed adjacent to the exposed side of the first structural wythe 60. Vibration of the structural wythe 60 and/or movement of the insulation wythe 70 or connector 10a may be necessary to ensure adequate engagement of the groove 72 and first segment 20 with the structural material. Once the structural material cures, the connector 10a is effectively anchored within the first structural wythe 60 and the insulation wythe 70 is anchored to the structural wythe 60 by groove 72.

The connector 10a is then pushed or driven through the insulation wythe 70 and into the first structural wythe 60 while the structural material is still unhardened. The pointed tips 27a on the connector 10a are configured to facilitate passage of the connector 10a through any preformed holes or to cut through the insulation when there are not any preformed holes in the insulation wythe, thereby facilitating the insertion of the connector 10a in either event. In order to insert the connector 10a to a desired depth, it may be necessary to apply a driving force to the trailing wall 40a, 40b of the connector 10a. This driving force may be applied by hand or with a tool, such as a hammer or mallet. The connector 10a is inserted through the insulation wythe 70 until the flanges 44a protruding away from the circular sidewalls 14a engage against the insulation wythe 70, thereby indicating the desired depth has been reached. Accordingly, the flanges 44a may be formed of any suitable structure for orienting the connector 10a within the insulation wythe 70 at a predetermined depth.

As the connector 10a is inserted through the insulation wythe 70, the recesses 45a between the pointed tips 27a may receive rebar 62 or other reinforcement that may be present in first structural wythe 60.

Once the connector 10a is properly oriented within the insulation wythe 70, the structural material of the first structural wythe 60 flows into and engages around tapered ends 26a, recesses 45a, a portion of sidewalls 14a, and ribs 14b of the first segment 20a of the connector 10a. These and other structures anchor the connector 10a. Vibration of the first wythe and/or movement of the connector 10a may be necessary to ensure adequate engagement of the first segment 20a with the structural material. In addition, vibration and/or movement may assist in engaging rebar 62 or other reinforcement within recesses 45a. Once the structural material cures, the connector 10a is effectively anchored within the first structural wythe 60.

After the first structural wythe 60 has achieved an adequate level of hardness or strength, a second wythe of structural material is poured over the surface of the insulating wythe 70 to form the second structural wythe 80, as shown in FIGS. 4A-4B. The depth of the second structural wythe 80 should be such that it completely, or at least substantially, engulfs the trailing wall 40a, 40b of the connector and engages hole formations 46a or other anchor formed in the trailing segment 22a of the connector 10a, thereby providing an adequate anchoring effect of the connector 10a within the second structural wythe 80. The material of structural wythe 80 flows into groove 72 to anchor structural wythe 80 to insulation wythe 70. The flange 44a also aids in preventing the hardened second structural wythe 80 from collapsing against the first structural wythe 60 when hardened and tilted up or otherwise positioned for use.

FIG. 5B shows the use of dovetail shaped grooves 72 formed on the major surfaces of the insulating wythe 70. The material of the structural wythes 60, 80 flows into grooves 72 and forms a mechanical bond between the structural wythes 60, 80 and the insulation wythe 70. Grooves on opposite major surfaces of the insulation wythe 70 may be formed congruently, as shown in FIG. 5B or may be offset or staggered as shown in FIGS. 4A-4B.

With the configurations illustrated in FIGS. 4A and 4B or 5A and 5B, it may be desirable to lay a second insulating wythe over the yet unhardened second structural wythe 80, followed by the insertion of additional connectors through the second insulation wythe and second structural wythe. Thereafter, a third structural wythe may be cast over the surface of the second insulating wythe as before. Because of the simplicity of molding the connectors of the present invention, an adapted connector could be molded that would connect three or more structural wythes together. Alternatively, the three or more structural wythes can be held together using overlapping connectors of the type shown in FIGS. 1-5B.

Figure 3C:
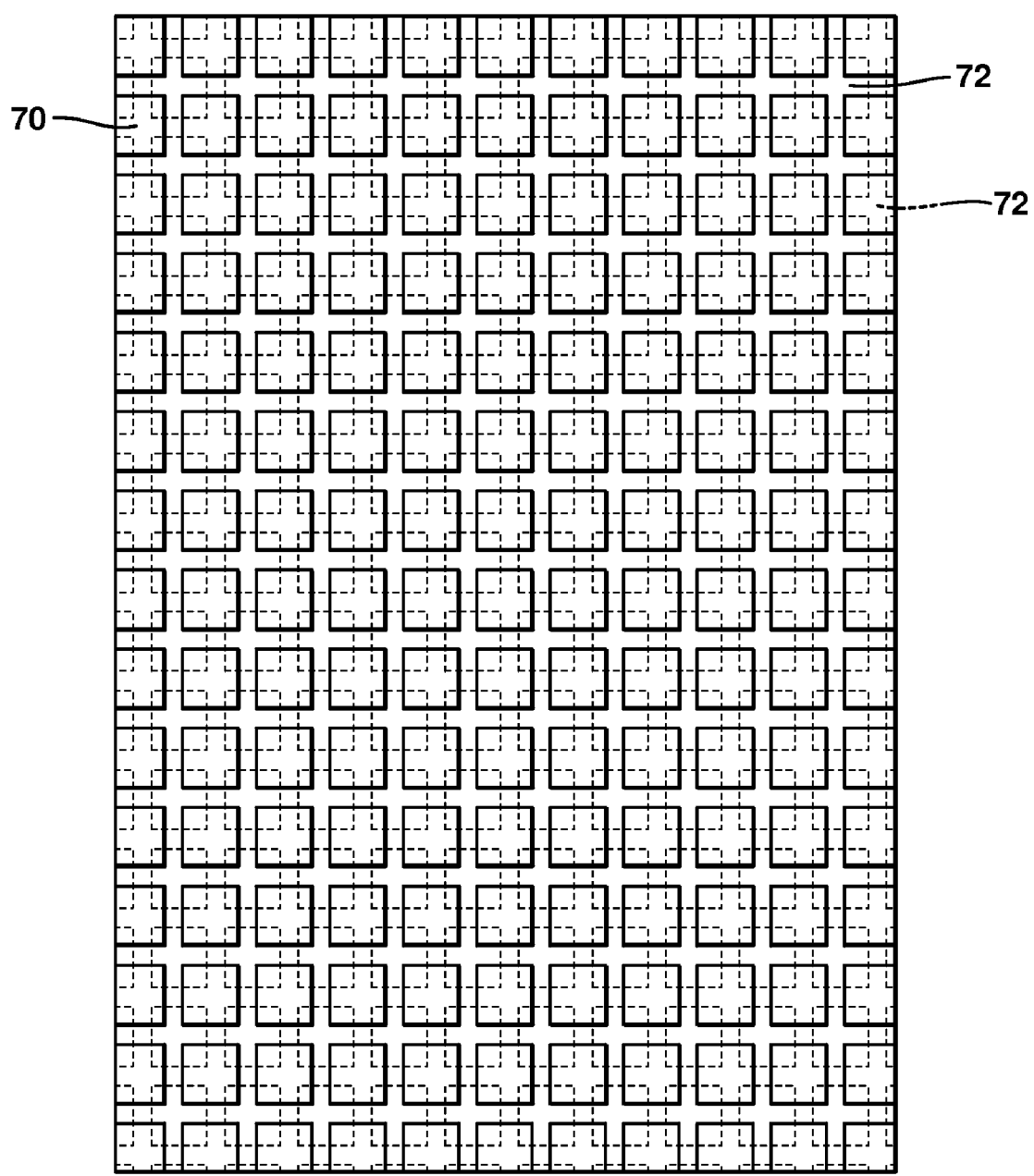
FIG. 3C is a plan view of an insulating wythe having a groove pattern that may be used in the composite wall structure of the present invention.

Any groove configuration which provides a mechanical bond between the structural wythes 60 and the insulation wythe 70 may be used. FIGS. 3A-3C show three suitable groove configurations.

FIG. 3A shows insulation wythe 70 having a transverse or horizontal pattern of grooves 72. The grooves 72 may be spaced at any distance that provides an improved mechanical bond between the structural wythes 60, 80 and the insulation wythe 70. Preferably, the grooves have a spacing of less than 12 in. on center and preferably less 6.5 in. (on center) or 4 in. (on center). As shown in FIG. 4B, the grooves on opposite major surfaces of the insulation wythe 70 may be offset to improve the degree of composite action of the finished structure.

FIG. 3B shows insulation wythe 70 having a grid or diamond shaped groove pattern. The grooves 72 may be spaced at any distance that provides an improved mechanical bond between the structural material 60 and the insulation wythe 70. Preferably, the grooves have a spacing of less than 12 in. on center and preferably less 6.5 in. (on center) or 4 in. (on center). As shown in FIG. 4A, the grooves on opposite major surfaces of the insulation wythe 70 may be offset to improve the degree of composite action of the finished structure. The grooves may be positioned at any angle, although it has been found that a diamond pattern that is wider than it is tall provides an improved degree of composite action. One preferred shape is a diamond having 60° angles on the horizontal axis and 120° angles on the vertical axis. Another suitable shape is a grid having four 90° angles.

FIG. 3C shows insulation wythe 70 having rectangular groove pattern. The grooves 72 may be spaced at any distance that provides an improved mechanical bond between the structural material 60 and the insulation wythe 70. Preferably, the grooves have a spacing of less than 12 in. on center and preferably less 6.5 in. (on center) or 4 in. (on center). As mentioned above, the grooves on opposite major surfaces of the insulation wythe 70 may be offset to improve the degree of composite action of the finished structure.

FIGS. 4A and 4B show a detail of the grooved insulation wythe 70 with grooves 72 formed on the opposed major surfaces and interlocking sections 61, 81 of the structural wythes 60, 80. Grooves 72 form at least one shoulder 72a in the remaining material of the insulation wythe 70. The material of the structural wythes 60, 80 flows into the grooves and under the shoulder 72a to form a mechanical engagement between the structural wythes 60, 80 and the insulation wythe 70. The grooves may be formed by any suitable in-line method during manufacture of the insulation wythe or may formed off-line after manufacture of the material of the insulation wythe 70. One suitable method of forming the grooves is in an off-line step using a router. The groove may be of any suitable shape including square, dovetail, keyhole or a truncated teardrop shape.

It has been found that the connectors of the invention are capable of providing an assembled composite wall with about 50% to about 100% composite action. It will be appreciated that this is a significant improvement over prior art connectors that have been found, according to independent testing, to provide only 10% composite action. One benefit of providing such superior composite action is that it enables loads to be independently carried by each of the structural wythes. It will be appreciated that this is not possible when the composite action is small, such as when using the connectors of the prior art, because the shear forces caused by the independent loads could cause the structural wythes to break away from the composite wall.

The connectors according to the invention preferably provide at least about 60% composite action, more preferably at least about 70% composite action, more especially preferably at least about 80% composite action, and most preferably at least about 90% composite action.

The amount of composite action that is imparted by the connectors is also related to their spacing. All things being equal, connectors that are closer together will yield a composite wall structure having greater composite action, while connectors that are farther apart will yield a composite wall structure having less composite action. Thus, actual composite action can range anywhere between about 15% to about 100%. Depending on how much composite action is desired, it will be possible, based on the teachings described herein, to select a spacing pattern that will provide the desired level of composite action. One of ordinary skill in the art will be able to, based on the strength and composite action of the connectors, the strength and thickness of the structural wythes, the strength and thickness of the insulating wythe, and other factors that may be determined to affect overall composite wall action, design a spacing patter will provide the desired composite action.

EXAMPLES

Three structural panels, each having two wythes of concrete and an internal wythe of polystyrene foam insulation were prepared for testing. The concrete wythes were 3 in thick and the polystyrene layer was 2 in. thick. The polystyrene foam was FOAMULAR F250 (available from Owens Corning of Toledo, Ohio) having horizontal dovetail grooves having a depth of 0.5 in.; a base width of 1.0 in.; and a surface width of 0.75 in. The grooves were spaced along the length of the board by 6.0 in. (on center).

The finished panel was 8 in thick by 8.0 feet wide and 32.0 feet high. The panels included 144 connectors as shown in FIG. 5B in 18 rows and 6 columns. The rows were 16 inches on center apart and the connectors with in each row were 16 inches on center apart.

The panels were supported by a span equal to 31 feet and load tests were performed using negative air pressure to simulate uniform wind loading. The panel properties compressive strength of concrete ($f_{c\text{-}avg}$), modulus of elasticity ($E_c$), modulus of rupture ($f_R$) and cracking moment ($M_{cr}$) were measured for each panel as:

| Panel | $f_{c\text{-}avg}$ (psi) | $E_c$ (psi) | $f_R$ (psi) | $M_{cr}$ (lb-in) |
|---|---|---|---|---|
| 1 | 8,670 | $5.307 \times 10^6$ | 698 | $7.039 \times 10^5$ |
| 2 | 8,120 | $5.136 \times 10^6$ | 676 | $6.812 \times 10^5$ |
| 3 | 7,863 | $5.054 \times 10^6$ | 665 | $6.703 \times 10^5$ |
| Average | 8,220 | $5.167 \times 10^6$ | 680 | $6.854 \times 10^5$ |

The wall was assumed to be uniformly supported and uniformly loaded and the deflection was calculated as:

$$\Delta = (5\omega L^4)/384 EI$$

The gross moment of inertia $I_g$ was used to calculate the deflection of the wall panel prior to cracking and the cracking moment of inertia $I_{cr}$ (PCI Equation 4.8.2 5$^{th}$ edition) was used after cracking, respectively:

$$I_g = I_o + Ad^2$$

$$I_g = 4032 \text{ in}^4$$

$$I_{cr} = nA_{ps}d_p^2 \times [1 - 1.6 \times \sqrt{n\rho_p}]$$

$$I_{cr} = 104.2 \text{ in}^4$$

The effective moment of inertia ($I_e$) was calculated using (ACI Equation 9-8, 2002)

$$I_e = (M_{cr}/M_a)^3 I_g + [1 - (M_{cr}/M_a)^3]$$

Figure 6:
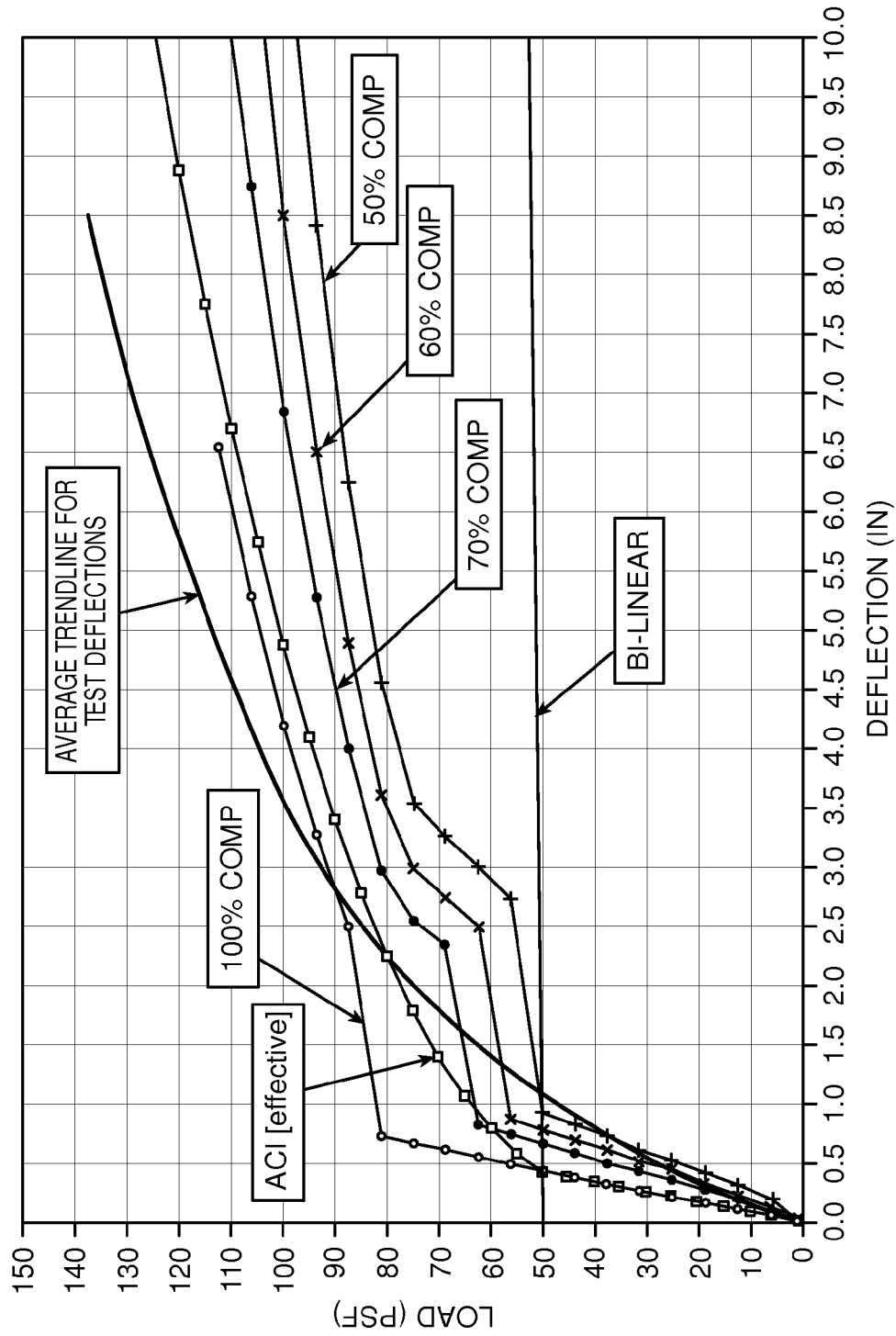
FIG. 6 is a graphical illustration showing the deflection in the wall panel system including the connector of the present invention.

LECWall software available from Losch Software of Palatine, Ill. was used to calculate the deflection in the wall panel. The theoretical composite action at 50%, 60%, 70% and 100% was calculated using the LECWall software and is shown in Table 1 and in FIG. 6.

TABLE 1

| ω (lb/ft) | Load (psf) | Deflection at Calculated Composite Action | | | | Average Deflection Test Data Curve Fit (in.) |
|---|---|---|---|---|---|---|
| | | 50% (in.) | 60% (in.) | 70% (in.) | 100% (in.) | |
| 0 | 0 | 0 | 0 | 0 | 0 | 0.00 |
| 50 | 6 | 0.22 | 0.17 | 0.14 | 0.06 | 0.09 |
| 100 | 13 | 0.32 | 0.26 | 0.21 | 0.11 | 0.21 |
| 150 | 19 | 0.43 | 0.35 | 0.29 | 0.17 | 0.33 |
| 200 | 25 | 0.53 | 0.44 | 0.37 | 0.22 | 0.46 |
| 250 | 31 | 0.63 | 0.53 | 0.45 | 0.28 | 0.61 |
| 300 | 38 | 0.73 | 0.62 | 0.52 | 0.34 | 0.76 |
| 350 | 44 | 0.84 | 0.7 | 0.6 | 0.39 | 0.92 |
| 400 | 50 | 0.94 | 0.79 | 0.68 | 0.45 | 1.10 |
| 450 | 56 | 2.74 | 0.88 | 0.75 | 0.5 | 1.28 |
| 500 | 63 | 3.01 | 2.52 | 0.83 | 0.56 | 1.50 |
| 550 | 69 | 3.27 | 2.75 | 2.35 | 0.62 | 1.74 |
| 600 | 75 | 3.54 | 2.98 | 2.55 | 0.67 | 2.00 |
| 650 | 81 | 4.56 | 3.61 | 2.97 | 0.73 | 2.31 |
| 700 | 88 | 6.24 | 4.89 | 4 | 2.5 | 2.66 |
| 750 | 94 | 8.41 | 6.5 | 5.27 | 3.27 | 3.08 |
| 800 | 100 | 11.19 | 8.51 | 6.84 | 4.19 | 3.58 |
| 850 | 106 | 14.74 | 10.98 | 8.73 | 5.28 | 4.17 |
| 900 | 113 | 19.27 | 13.99 | 10.98 | 6.54 | 4.85 |

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

I claim:

1. A composite wall panel, comprising:
 a first layer of hardenable structural material;
 a second layer of hardenable structural material;
 an insulating foam layer disposed between the first and second structural layers, the foam layer including a first major side in contact with the first layer of structural material and a second major side in contact with the second layer of structural material, the first and second major sides of the insulating foam layer each having at least one groove, each groove having at least one groove shoulder; and
 at least one connector configured to anchor the first and second layers of structural material to one another and to the insulating foam layer, each connector having a body with a first segment embedded in the first layer of structural material, a trailing segment embedded in the second layer of structural material and a mesial segment embedded in the insulating foam layer;
 wherein the first and second layers of hardenable structural material extend into the grooves and under the groove shoulders to form a mechanical engagement between the insulating foam layer and the first and second layers of hardenable structural material;
 further wherein the connector body comprises:
  two sidewalls that are spaced apart and that have a width or diameter;
  a web portion extending between the two sidewalls, the web portion having a thickness that is less than the width or diameter of the sidewalls; and
  a tapered end configured to facilitate penetration of the connector through the insulating foam layer and the first layer of hardenable structural material adjacent to the insulating foam layer.

2. The composite wall panel of claim 1, wherein the grooves have opposing sides, and each side of the grooves has a groove shoulder.

3. The composite wall panel of claim 2, wherein the groove shoulders have a straight segment.

4. The composite wall panel of claim 1, wherein the grooves have a dovetail cross-sectional shape.

5. The composite wall panel of claim 1, wherein the grooves have a generally cylindrical cross-sectional shape.

6. The composite wall panel of claim 1, wherein the grooves have a generally truncated tear-drop cross-sectional shape.

7. The composite wall panel of claim 1, wherein the at least one groove on the first side of the foam layer and the at least one groove on the second side of the foam layer are offset from each other.

8. The composite wall panel of claim 1, wherein the first segment of the connector has a plurality of pointed tips positioned in the first layer of structural material and wherein reinforcing members are positioned between the pointed tips in the first layer of molded structural material.

9. The composite wall panel of claim 1, wherein the composite wall panel provides composite action from about 50% to about 100%.

10. The composite wall panel of claim 1, wherein the composite wall panel provides composite action of at least about 70%.

11. The composite wall panel of claim 1, wherein the connector body further comprises at least one flange disposed adjacent the second major side of the foam insulation layer.

12. The composite wall panel of claim 1, wherein the at least one groove in the major sides of the insulating foam layer extends in a horizontal direction.

13. The composite wall panel of claim 1, wherein the at least one groove in the major sides of the insulating foam layer comprises multiple grooves intersecting one another at right angles.

14. The composite wall panel of claim 1, wherein the at least one groove in the major sides of the insulating foam layer comprises multiple grooves intersecting one another in a diamond pattern.

15. A composite wall panel, comprising:
 a first layer of molded structural material;
 a second layer of molded structural material;
 an insulating foam layer disposed between the first and second molded structural layers, the foam layer including a first major side in contact with the first layer of molded structural material and a second major side in contact with the second layer of molded structural material, the first and second major sides of the insulating foam layer each having at least one groove, the at least one groove having a dovetail cross-sectional shape; and
 at least one connector configured to anchor the first and second layers of structural material to one another and to the insulating foam layer, each connector having a body with a first segment embedded in the first layer of structural material, and a mesial segment embedded in the insulating foam layer;
 wherein the first and second layers of molded structural material extend into the dovetail shape of the grooves to form a mechanical engagement between the insulating foam layer and the first and second layers of molded structural material;
 further wherein the connector body comprises:
  two sidewalls that are spaced apart and that have a width or diameter;
  a web portion extending between the two sidewalls, the web portion having a thickness that is less than the width or diameter of the sidewalls; and
  a tapered end configured to facilitate penetration of the connector through the insulating foam layer and the first layer of molded structural material adjacent to the insulating foam layer.

16. The composite wall panel of claim 15, wherein the at least one groove on the first side of the foam layer and the at least one groove on the second side of the foam layer are offset from each other.

17. The composite wall panel of claim 15, wherein the connector has a plurality of pointed tips positioned in the first layer of molded structural material and wherein reinforcing members are positioned between the pointed tips in the first layer of molded structural material.

18. The composite wall panel of claim 15, wherein the composite wall panel provides composite action from about 50% to about 100%.

19. The composite wall panel of claim 15, wherein the composite wall panel provides composite action of at least about 70%.

20. The composite wall panel of claim 15, wherein the connector body further comprises at least one flange disposed adjacent the second major side of the foam insulation layer.

21. The composite wall panel of claim 15, wherein the at least one groove in the major sides of the insulating foam layer extends in a horizontal direction.

22. The composite wall panel of claim 15, wherein the at least one groove in the major sides of the insulating foam layer comprises multiple grooves intersecting one another at right angles.

23. The composite wall panel of claim 15, wherein the at least one groove in the major sides of the insulating foam layer comprises multiple grooves intersecting one another in a diamond pattern.

24. A composite wall panel comprising:

a first layer of structural material;

a second layer of structural material;

an insulating foam layer disposed between the first and second structural layers, the foam layer including a first major side in contact with the first layer of structural material and a second major side in contact with the second layer of structural material, the first and second major sides of the insulating foam layer each having at least one groove; and at least one connector configured to anchor the first and second layers of structural material to one another and to the insulating foam layer, each connector having a body with a first segment embedded in the first layer of structural material, and a mesial segment embedded in the insulating foam layer;

wherein the first and second layers of structural material extend into the grooves to form a mechanical engagement between the insulating foam layer and the first and second layers of structural material;

further wherein the connector body comprises:

two sidewalls that are spaced apart and that have a width or diameter;

a web portion extending between the two sidewalls, the web portion having a thickness that is less than the width or diameter of the sidewalls.

25. The composite wall panel of claim 24, wherein the first segment of the connector has a plurality of pointed tips positioned in the first layer of structural material and wherein reinforcing members are positioned between the pointed tips in the first layer of molded structural material.

* * * * *